(12) United States Patent
Moon et al.

(10) Patent No.: US 11,302,474 B2
(45) Date of Patent: Apr. 12, 2022

(54) CAPACITOR COMPONENT

(71) Applicant: SAMSUNG ELECTRO-MECHANICS CO., LTD., Suwon-si (KR)

(72) Inventors: Kook Joo Moon, Suwon-si (KR); Mi Young Kim, Suwon-si (KR); Doo Yeon Hwang, Suwon-si (KR); Jin Kyung Joo, Suwon-si (KR); Ho Jun Lee, Suwon-si (KR); Gam Woo Kim, Suwon-si (KR); Chang Su Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 149 days.

(21) Appl. No.: 16/566,238

(22) Filed: Sep. 10, 2019

(65) Prior Publication Data

US 2020/0176186 A1 Jun. 4, 2020

(30) Foreign Application Priority Data

Nov. 30, 2018 (KR) .......................... 10-2018-0152362

(51) Int. Cl.
*H01G 4/005* (2006.01)
*H01G 4/12* (2006.01)

(52) U.S. Cl.
CPC ............... *H01G 4/005* (2013.01); *H01G 4/12* (2013.01)

(58) Field of Classification Search
CPC ...... H01G 4/005; H01G 4/0085; H01G 4/012; H01G 4/12; H01G 4/232; H01G 4/2325; H01G 4/252; H01G 4/30

See application file for complete search history.

(56) References Cited

U.S. PATENT DOCUMENTS 8,154,848 B2 * 4/2012 Motoki ................... H01G 4/30
361/306.1
8,456,796 B2 * 6/2013 Motoki ................ H01G 4/2325
361/306.1

(Continued)

FOREIGN PATENT DOCUMENTS

CN 102194570 A 9/2011
CN 102222562 A 10/2011
(Continued)

OTHER PUBLICATIONS

Korean Office Action dated Dec. 17, 2019 issued in Korean Patent Application No. 10-2018-0152362 (with English translation).

(Continued)

*Primary Examiner* — Nathan Milakovich
(74) *Attorney, Agent, or Firm* — Morgan, Lewis & Bockius LLP

(57) ABSTRACT

A capacitor component includes a body including a dielectric layer, and a first internal electrode and a second internal electrode disposed to oppose each other in a first direction with the dielectric layer interposed therebetween; a first external electrode and a second external electrode disposed on the body, and respectively connected to the first internal electrode; and a third external electrode and a fourth external electrode disposed on the body, and respectively connected to the second internal electrode, wherein the first and second external electrodes include a connection metal layer, a ceramic layer, a metal layer, and a plated layer, respectively, sequentially disposed on the body, wherein the plated layer is extended and disposed to contact end surfaces of the connection metal layer, the ceramic layer, and the metal layer in the first direction, respectively.

18 Claims, 6 Drawing Sheets

(56) References Cited

U.S. PATENT DOCUMENTS

| | | | |
|---|---|---|---|
| 8,982,534 B2* | 3/2015 | Kwag | H01G 4/232 |
| | | | 361/306.3 |
| 10,217,568 B2 | 2/2019 | Nagai et al. | |
| 10,418,180 B2* | 9/2019 | Kageyama | H01G 4/232 |
| 10,629,379 B2 | 4/2020 | Cho et al. | |
| 10,650,971 B2* | 5/2020 | Jung | H01G 4/12 |
| 10,991,512 B2* | 4/2021 | Park | H01G 4/008 |
| 2007/0205514 A1* | 9/2007 | Togashi | H01G 4/30 |
| | | | 257/758 |
| 2010/0085681 A1 | 4/2010 | Takeda | |
| 2011/0205684 A1 | 8/2011 | Yamamoto et al. | |
| 2011/0234045 A1 | 9/2011 | Motoki et al. | |
| 2011/0236658 A1 | 9/2011 | Motoki et al. | |
| 2012/0188684 A1 | 7/2012 | Akazawa et al. | |
| 2012/0236461 A1 | 9/2012 | Yamamoto et al. | |
| 2013/0062994 A1 | 3/2013 | Ogawa et al. | |
| 2013/0250476 A1 | 9/2013 | Chung et al. | |
| 2015/0014033 A1 | 1/2015 | Park et al. | |
| 2016/0203914 A1 | 7/2016 | Park et al. | |
| 2017/0018360 A1 | 1/2017 | Osada et al. | |
| 2017/0263383 A1 | 9/2017 | Kageyama et al. | |
| 2017/0290163 A1 | 10/2017 | Hirota et al. | |
| 2017/0352479 A1 | 12/2017 | Sawada et al. | |
| 2018/0190433 A1* | 7/2018 | Cho | H01G 4/30 |
| 2018/0233289 A1* | 8/2018 | Nagai | H01G 4/1227 |
| 2020/0203072 A1* | 6/2020 | Park | H01G 4/12 |
| 2021/0005390 A1* | 1/2021 | Lee | H01G 4/12 |

FOREIGN PATENT DOCUMENTS

| | | |
|---|---|---|
| CN | 102683012 A | 9/2012 |
| CN | 102693836 A | 9/2012 |
| CN | 103325568 A | 9/2013 |
| CN | 104282437 A | 1/2015 |
| CN | 106133856 A | 11/2016 |
| CN | 107180699 A | 9/2017 |
| CN | 108269688 A | 7/2018 |
| CN | 108364786 A | 8/2018 |
| JP | H11-288840 A | 10/1999 |
| KR | 10-2010-0008380 A | 1/2010 |
| KR | 10-2012-0086660 A | 8/2012 |
| KR | 10-2017-0113129 A | 10/2017 |
| KR | 10-2017-0138044 A | 12/2017 |
| KR | 10-2018-0079807 A | 7/2018 |

OTHER PUBLICATIONS

Chinese Office Action dated Apr. 6, 2021 issued in Chinese Patent Application No. 201911177730.8 (with English translation).

* cited by examiner

CAPACITOR COMPONENT

CROSS-REFERENCE TO RELATED APPLICATION

This application claims benefit of priority to Korean Patent Application No. 10-2018-0152362 filed on Nov. 30, 2018 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor (MLCC), a capacitor component, may be small in size, may be high in capacity and may be easily mounted.

Recently, as electronic components are being provided with higher performance, currents to be used may be increasing. In order to increase the battery usage time, it may be necessary to reduce the use voltage and to make it slim.

To do this, the impedance of terminals of the set power supply that connects the DC-DC converter and the integrated circuit chip (IC) should be reduced.

In general, in order to reduce impedance, there may be a method of using a plurality of MLCCs connected in parallel. However, there may be a problem that an area to be mounted increases.

Therefore, a three-terminal type MLCC in which three external electrodes may be formed to lower equivalent series inductance (ESL) may be used.

However, since the size of the MLCC is getting smaller according to the demand for miniaturization, the conventional external electrode forming method has a problem that the three terminals may be in contact with each other.

SUMMARY

An aspect of the present disclosure is to provide a capacitor component having an external electrode conforming to miniaturization of the capacitor component.

According to an aspect of the present disclosure, a capacitor component includes a body including a dielectric layer, and a first internal electrode and a second internal electrode disposed to oppose each other in a first direction with the dielectric layer interposed therebetween, and including a first surface and a second surface opposing each other in the first direction, a third surface and a fourth surface connected to the first and second surfaces and opposing each other in a second direction, a fifth surface and a sixth surface connected to the first to fourth surfaces and opposing each other in a third direction; a first external electrode and a second external electrode respectively disposed on the third and fourth surfaces of the body, and connected to the first internal electrode; and a third external electrode and a fourth external electrode respectively disposed on the fifth and sixth surfaces of the body, and connected to the second internal electrode, wherein the first and second external electrodes include a connection metal layer, a ceramic layer, a metal layer, and a plated layer, respectively, sequentially disposed on the body, wherein the plated layer is extended and disposed to contact end surfaces of the connection metal layer, the ceramic layer, and the metal layer in the first direction, respectively.

BRIEF DESCRIPTION OF DRAWINGS

The above and other aspects, features, and advantages of the present disclosure would be more clearly understood from the following detailed description, taken in conjunction with the accompanying drawings.

DETAILED DESCRIPTION

Figure 1:
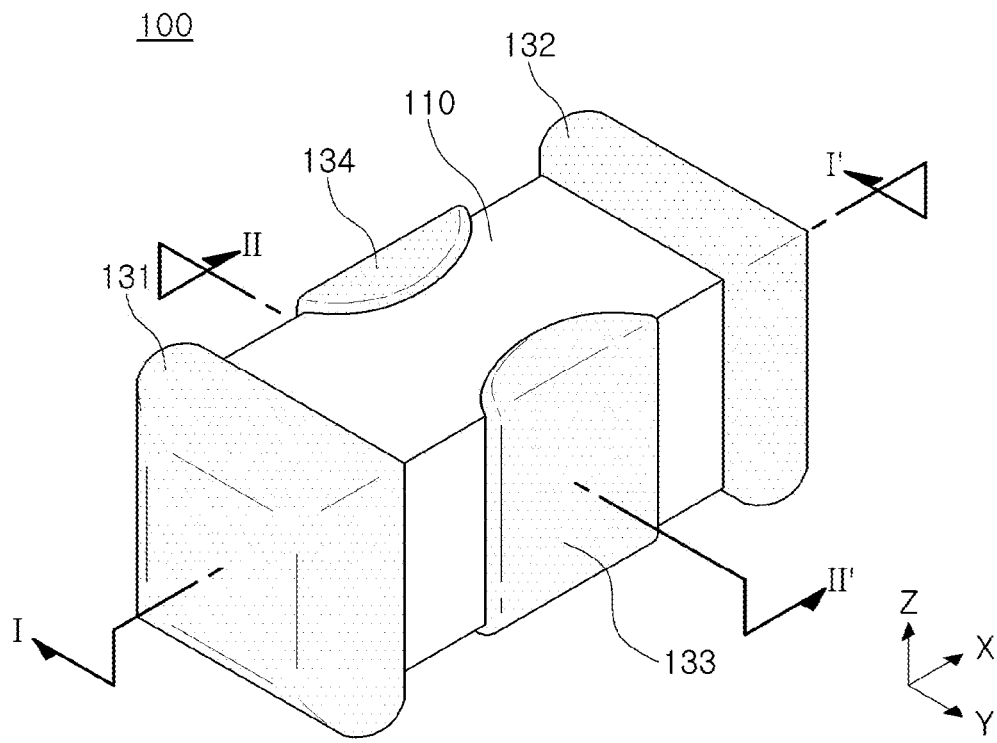
FIG. 1 is a perspective view schematically illustrating a capacitor component according to an embodiment of the present disclosure.

Hereinafter, embodiments of the present disclosure are described with reference to specific embodiments and the accompanying drawings. However, the embodiments of the present disclosure may be modified into various other forms, and the scope of the present disclosure is not limited to the embodiments described below. Further, the embodiments of the present disclosure may be provided for a more complete description of the present disclosure to the ordinarily skilled artisan. Therefore, shapes and sizes of the elements in the drawings may be exaggerated for clarity of description, and the elements denoted by the same reference numerals in the drawings may be the same elements.

In the drawings, portions not related to the description are omitted for clarification of the present disclosure, and a thickness may be enlarged to clearly show layers and regions. The same reference numerals will be used to designate the same components in the same reference numerals. Further, throughout the specification, when an element is referred to as "comprising" or "including" an element, it means that the element may include other elements as well, without departing from the other elements, unless specifically stated otherwise.

In the drawings, an X direction may be defined as a second direction, an L direction, or a longitudinal direction, a Y direction may be defined as a third direction, a W direction, or a width direction, and a Z direction may be defined as a first direction, a T direction, or a thickness direction.

Capacitor Component

FIG. 1 is a perspective view schematically illustrating a capacitor component according to an embodiment of the present disclosure.

Figure 2:
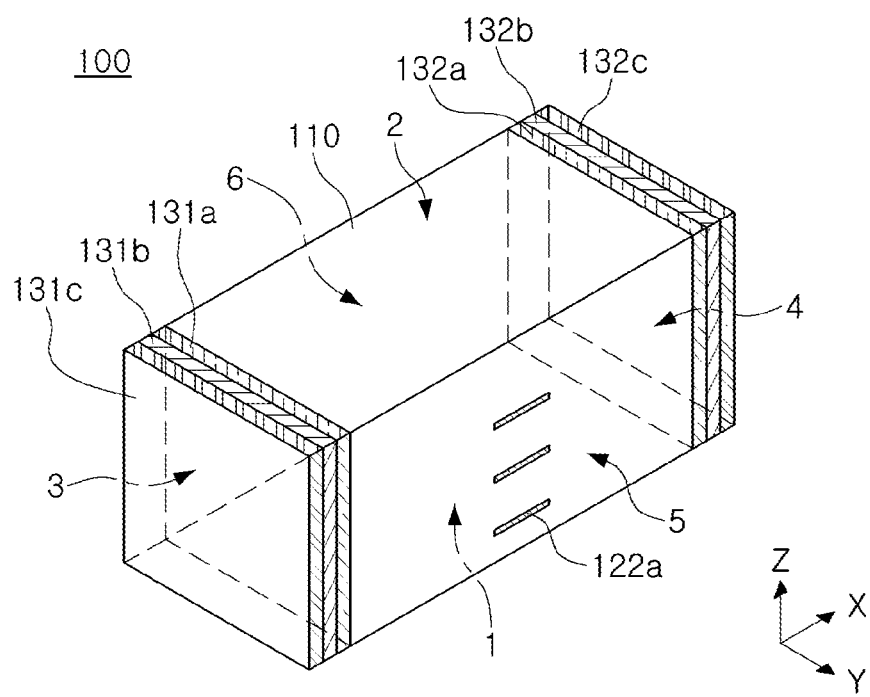
FIG. 2 is a perspective view illustrating with the exception of plated layers of the first to fourth external electrodes in FIG. 1.

FIG. 2 is a perspective view illustrating with the exception of plated layers of the first to fourth external electrodes in FIG. 1.

Figure 3:
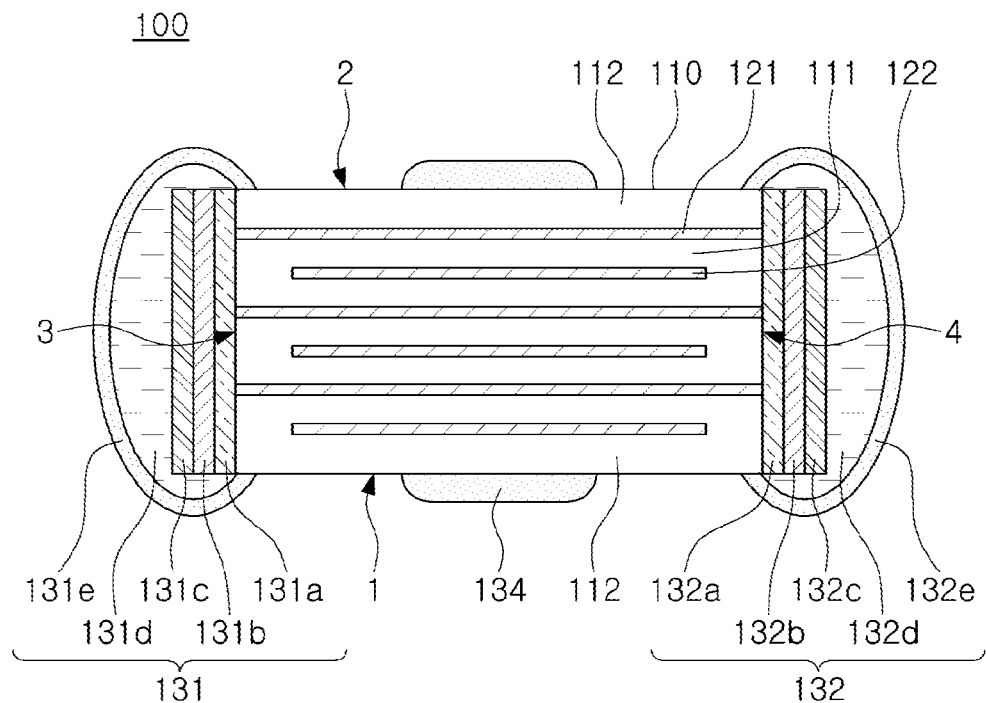
FIG. 3 is a cross-sectional view taken along line I-I' in FIG. 1.

FIG. 3 is a cross-sectional view taken along line I-I' in FIG. 1.

Figure 4:
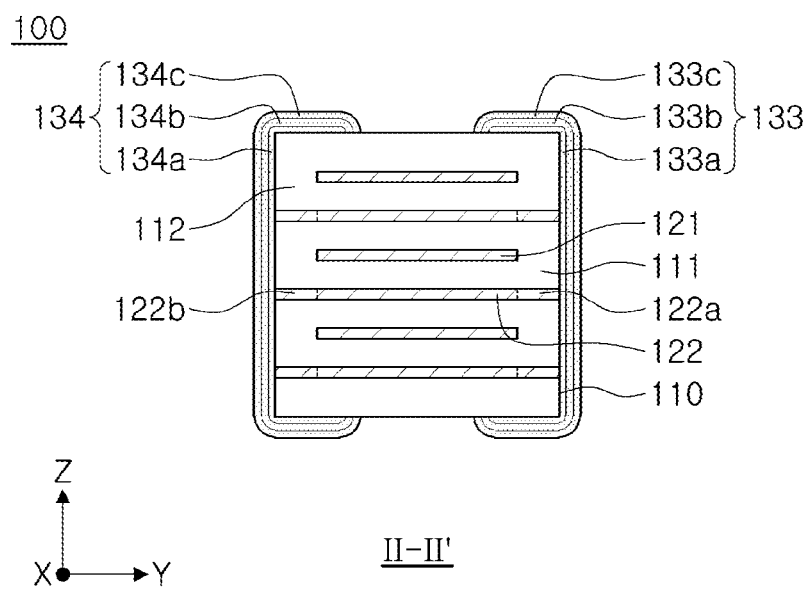
FIG. 4 is a cross-sectional view taken along line II-II' in FIG. 1.

FIG. 4 is a cross-sectional view taken along line II-II' in FIG. 1.

Figure 5A:
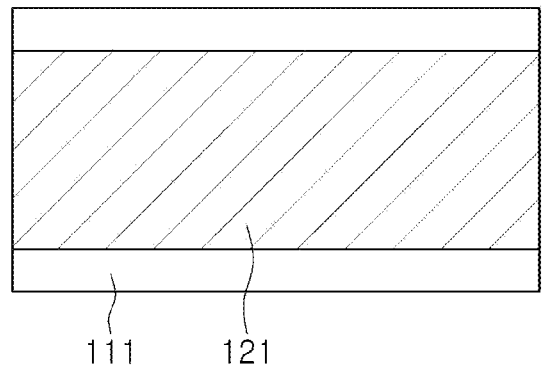
FIG. 5A illustrates a ceramic green sheet in which a first internal electrode is printed on a dielectric layer.
Figure 5B:
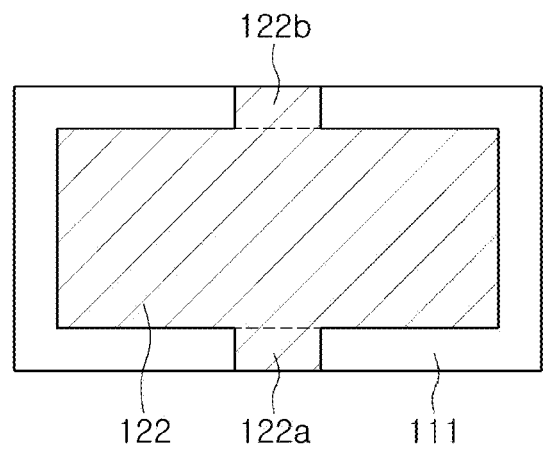
FIG. 5B illustrates a ceramic green sheet in which a second internal electrode is printed on a dielectric layer.

FIG. 5A illustrates a ceramic green sheet in which a first internal electrode is printed on a dielectric layer, and FIG. 5B illustrates a ceramic green sheet in which a second internal electrode is printed on a dielectric layer.

Hereinafter, a capacitor component according to an embodiment of the present disclosure will be described in detail with reference to FIGS. 1 to 5.

A capacitor component 100 according to an embodiment of the present disclosure may include a body 110 including a dielectric layer 111, and a first internal electrode 121 and a second internal electrode 122 disposed to oppose each other in a first direction (a Z direction) with the dielectric layer interposed therebetween, and including a first surface 1 and a second surface 2 opposing each other in the first direction (the Z direction), a third surface 3 and a fourth surface 4 connected to the first and second surfaces and opposing each other in a second direction (an X direction), a fifth surface 5 and a sixth surface 6 connected to the first to fourth surfaces and opposing each other in a third direction (a Y direction); a first external electrode 131 and a second external electrode 132 respectively disposed on the third and fourth surfaces of the body, and connected to the first internal electrode 121; and a third external electrode 133 and a fourth external electrode 134 respectively disposed on the fifth and sixth surfaces of the body, and connected to the second internal electrode 122, wherein the first and second external electrodes 131 and 132 may include first and second connection metal layers 131a and 132a, first and second ceramic layers 131b and 132b, first and second metal layers 131c and 132c, and first and second plated layers 131d and 132d, respectively, sequentially disposed on the body, wherein the first and second plated layers 131d and 132d may be extended and disposed to contact end surfaces of the first and second connection metal layers 131a and 132a, the first and second ceramic layers 131b and 132b, and the first and second metal layers 131c and 132c in the first direction (the Z direction), respectively.

The body 110 may have the dielectric layer 111 and the first and second internal electrodes 121 and 122, alternately stacked.

The specific shape of the body 110 is not particularly limited. As illustrated, the body 110 may have a hexahedral shape or the like. Due to shrinkage of a ceramic powder contained in the body 110 during a sintering process, the body 110 may not have a hexahedral shape with a complete straight line, but may have substantially hexahedral shape.

The body 110 may have the first and second surfaces 1 and 2 opposing each other in the thickness direction (the Z direction), the third and fourth surfaces 3 and 4 connected to the first and second surfaces 1 and 2 and opposing each other in the longitudinal direction (the X direction), and the fifth and sixth surfaces 5 and 6 connected to the first and second surfaces 1 and 2, connected to the third and fourth surfaces 3 and 4, and opposing each other in the width direction (the Y direction).

In this case, one surface selected from the first, second, fifth, and sixth surfaces 1, 2, 5, and 6 may be a surface for mounting.

The plurality of dielectric layers 111 forming the body 110 may be in a sintered state, and may be difficult to confirm a boundary between adjacent dielectric layers 111 without using a scanning electron microscope (SEM).

According to an embodiment of the present disclosure, a raw material for forming the dielectric layer 111 is not particularly limited, as long as a sufficient capacitance may be obtained. For example, a barium titanate-based material, a lead composite perovskite-based material, a strontium titanate-based material, or the like may be used.

Various ceramic additives, organic solvents, plasticizers, binders, dispersants, and the like may be added to the powder of barium titanate ($BaTiO_3$) according to the purpose of the present disclosure, as the material for forming the dielectric layer 111.

Lower and upper cover layers 112 of a predetermined thickness may be formed on a lower surface of a lowermost internal electrode of the body 110 and on an upper portion of an uppermost internal electrode of the body 110, respectively. In this case, the lower and upper cover layers 112 may have the same composition as the dielectric layer 111, and dielectric layers not including an internal electrode may be formed by stacking at least one thereof on an upper portion of an uppermost internal electrode and on a lower surface of a lowermost internal electrode, respectively.

The plurality of the first and second internal electrodes 121 and 122 may be disposed to oppose each other with the dielectric layer 111 interposed therebetween.

The first and second internal electrodes 121 and 122 may include first and second internal electrodes 121 and 122 alternately arranged to oppose each other with a dielectric layer interposed therebetween.

The first internal electrode 121 may be exposed to the third and fourth surfaces 3 and 4 of the body 110, and may be connected to the first and second external electrodes 131 and 132.

The second internal electrode 122 may include first and second lead portions 122a and 122b respectively exposed to the fifth and sixth surfaces 5 and 6 of the body 110, and may be connected to the third and fourth external electrodes 133 and 134 through the first and second lead portions 122a and 122b.

The first and second internal electrodes 121 and 122 may be electrically separated from each other by the dielectric layer 111 interposed therebetween. The body 110 may be formed by alternatively stacking a ceramic green sheet (FIG. 5A) in which the first internal electrode 121 is printed on the dielectric layer 111, and a ceramic green sheet (FIG. 5B) in which the second internal electrode 122 is printed on the dielectric layer 111, in the thickness direction (Z direction), and then sintering them.

A material for forming the first and second internal electrodes 121 and 122 is not particularly limited, and may be formed, for example, by using a conductive paste including one or more nickel (Ni), copper (Cu), and a noble metal material such as palladium (Pd), a palladium-silver (Pd—Ag) alloy, or the like.

The conductive paste may be printed by a screen printing method or a gravure printing method, but the present disclosure is not limited thereto.

The first and second external electrodes 131 and 132 may be respectively disposed on the third and fourth surfaces 3 and 4, and may be connected to the first internal electrode 121.

The third and fourth external electrodes 133 and 134 may be respectively disposed on the fifth and sixth surfaces 5 and 6, and may be connected to the second internal electrode 122. The third and fourth external electrodes 133 and 134 may be spaced apart from the first and second external electrodes 131 and 132, and may be disposed between the first and second external electrodes 131 and 132. In this case, the third and fourth external electrodes 133 and 134 may extend to the first and second surfaces 1 and 2. The third and fourth external electrodes 133 and 134 may extend to the first and second surfaces 1 and 2, and may be also connected to each other to surround the body.

The first and second external electrodes 131 and 132 may be a signal electrode, and the third and fourth external electrodes 133 and 134 may be a ground electrode. As described above, when the external electrodes may be formed in a multi-terminal shape, the equivalent series inductance (ESL) may be lowered.

Since the third and fourth external electrodes 133 and 134 are spaced apart from the first and second external electrodes 131 and 132 and disposed between the first and second external electrodes 131 and 132, a problem in which the first and second external electrodes 131 and 132 may be in contact with the third and fourth external electrodes 133 and 134 in the electrode forming method may occur.

More specifically, conventionally, since the first and second external electrodes are formed using a method of dipping in a conductive paste, bent portions in which the first and second external electrodes may be extended to the first, second, fifth, and sixth surfaces may be formed. As a plated layer may be also formed and grown on the bent portion in a subsequent plating process, defects due to the blurring phenomenon in which plated layers of the first and second external electrodes are in contact with plated layers of the third and fourth external electrodes could occur.

Since, according to the present disclosure, the first and second external electrodes 131 and 132 include the first and second connection metal layers 131*a* and 132*a*, the first and second ceramic layers 131*b* and 132*b*, the first and second metal layers 131*c* and 132*c*, and the first and second plated layers 131*d* and 132*d*, arranged on the body in sequence, and the first and second plated layers 131*d* and 132*d* are extended and disposed to contact end surfaces of the first and second connection metal layers 131*a* and 132*a*, the first and second ceramic layers 131*b* and 132*b*, and the first and second metal layers 131*c* and 132*c* in the first direction (the Z direction), respectively, the defects due to the blurring phenomenon in which the first and second external electrodes 131 and 132 are in contact with the third and fourth external electrodes 133 and 134 may be prevented.

In this case, the first and second plated layers 131*d* and 132*d* may be extended and disposed to contact end surfaces of the connection metal layers 131*a* and 132*a*, the ceramic layers 131*b* and 132*b*, and the metal layers 131*c* and 132*c* in the first direction (the Z direction) and the third direction (the Y direction).

In the present disclosure, the first and second connection metal layers 131*a* and 132*a*, the first and second ceramic layers 131*b* and 132*b*, and the first and second metal layers 131*c* and 132*c* may be formed with no bent portion by a transfer method, end surfaces of the first and second connection metal layers 131*a* and 132*a*, the first and second ceramic layers 131*b* and 132*b*, and the first and second metal layers 131*c* and 132*c* in the first direction (the Z direction) and the third direction (the Y direction) may be formed to be exposed, the first and second plated layers 131*d* and 132*d* may be formed to cover the exposed end surfaces, when the first and second plated layers 131*d* and 132*d* are formed later. Therefore, the defects due to the blurring phenomenon in which the first and second external electrodes 131 and 132 are in contact with the third and fourth external electrodes 133 and 134 may be prevented.

The first and second connection metal layers 131*a* and 132*a* may be disposed on the third and fourth surfaces 3 and 4 of the body, and may be connected to the first internal electrode 121.

The first and second connection metal layers 131*a* and 132*a* may include a metal having a high electrical conductivity, may include the same metal as the first internal electrode 121 to improve the electrical connection with the first internal electrode 121, and may include, for example, nickel (Ni).

In this embodiment, the first and second connection metal layers 131*a* and 132*a* may be provided in the form of a sintered electrode, and may be sintered simultaneously with the body 110. In this case, the first and second connection metal layers 131*a* and 132*a* before the sintering process may be transferred to the body 110 in a state including metal particles and organic materials such as a binder, and the organic materials and the like may be removed after the sintering process.

Also, the first and second connection metal layers 131*a* and 132*a* may be disposed within a range that does not deviate from the third and fourth surfaces 3 and 4. Since the first and second connection metal layers 131*a* and 132*a* are disposed not to extend to the first, second, fifth, and sixth surfaces of the body, even when a size of the capacitor component is relatively small, the defects due to the blurring phenomenon in which the first and second external electrodes 131 and 132 are in contact with the third and fourth external electrodes 133 and 134 may be prevented.

The ceramic layers 131*b* and 132*b* may be disposed on the first and second connection metal layers 131*a* and 132*a*, to improve sealing characteristics and to minimize penetration of moisture, plating solution, and the like from the outside. The first and second ceramic layers 131*b* and 132*b* may be formed not to cover the end surfaces of the connection metal layers 131*a* and 132*a* in the first direction (the Z direction) and the third direction (the Y direction).

The first and second ceramic layers 131*b* and 132*b* may be made of a ceramic material such as barium titanate. In this case, the first and second ceramic layers 131*b* and 132*b* may include the same ceramic material as that contained in the body 110, and may be made of the same material as the body 110.

The first and second ceramic layers 131*b* and 132*b* may be formed by a transfer method in the same manner as the first and second connection metal layers 131*a* and 132*a*, and then may be subjected to a sintering process. Since it is preferable that the first and second ceramic layers 131*b* and 132*b* before the sintering process have relatively high adhesive force for the transfer process, the first and second ceramic layers 131*b* and 132*b* before the sintering process contain organic materials such as a binder in an amount more than the amount of the organic materials included in the body. In this case, since a portion of the organic materials may remain in the first and second ceramic layers 131*b* and 132*b* even after the sintering process, the ceramic layers 131*b* and 132*b* may contain larger amount of the organic materials than the body 110.

The first and second metal layers 131*c* and 132*c* may include a metal material that may be effectively plated to form the first and second plated layers 131*d* and 132*d*. For example, the first and second metal layers 131*c* and 132*c* may include copper (Cu), but the present disclosure is not limited thereto, and may be also made of the same material as the first and second connection metal layers 131*a* and 132*a*.

In this embodiment, the first and second ceramic layers 131b and 132b may be formed on the first and second connection metal layers 131a and 132a, respectively, and the first and second plated layers 131d and 132d may not be sufficiently formed when the first and second metal layers 131c and 132c are not present because the first and second ceramic layers 131b and 132b may be not formed with a plated layer.

The first and second metal layers 131c and 132c may be provided in the form of a sintered electrode, and may be sintered simultaneously with the body 110. In this case, the first and second metal layers 131c and 132c before the sintering process may be transferred to the body 110 in a state including metal particles and organic materials such as a binder, and the organic materials and the like may be removed after the sintering process.

Figure 6:
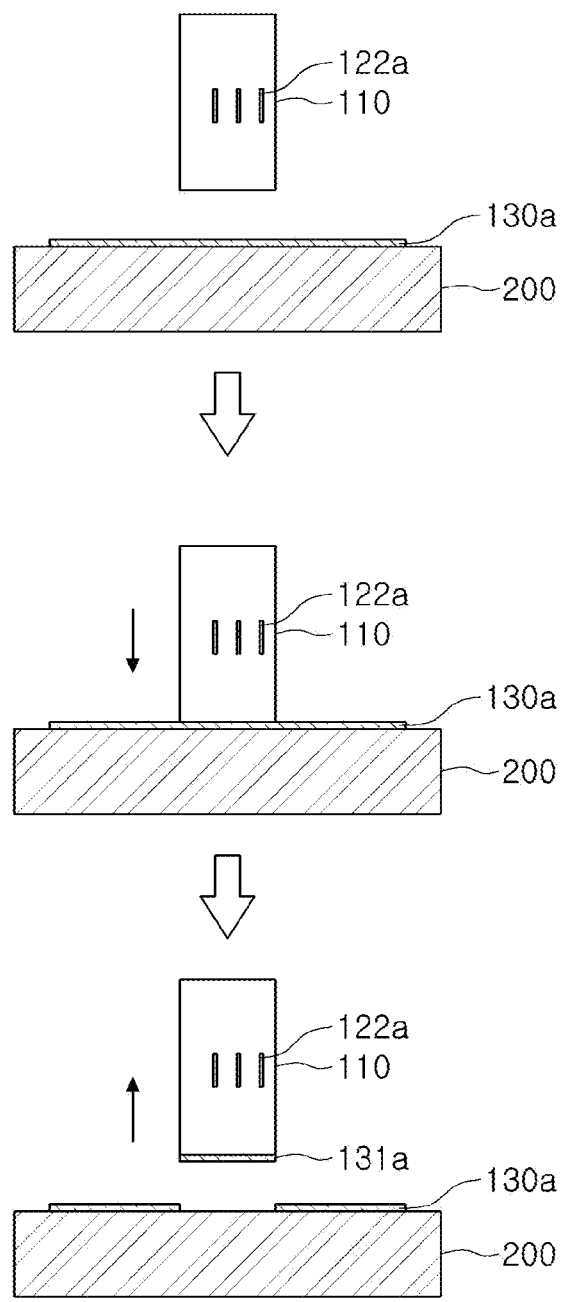
FIG. 6 illustrates a method of forming a connection metal layer 131*a* by a transfer method.
Figure 7:
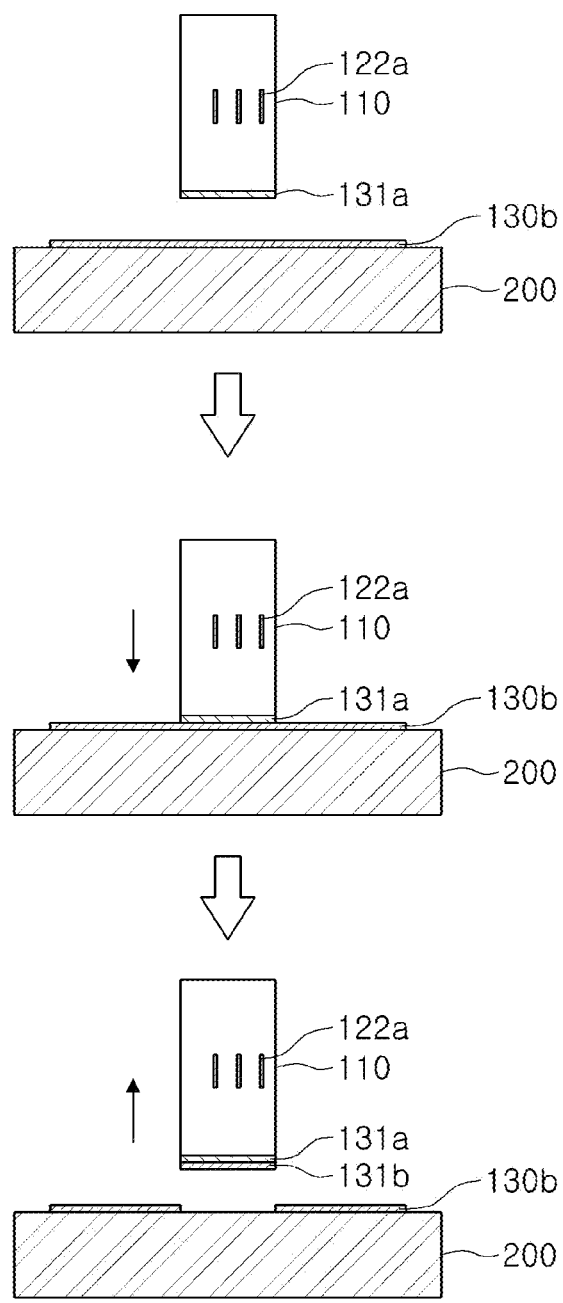
FIG. 7 illustrates a method of forming a ceramic layer 131*b* by a transfer method.
Figure 8:
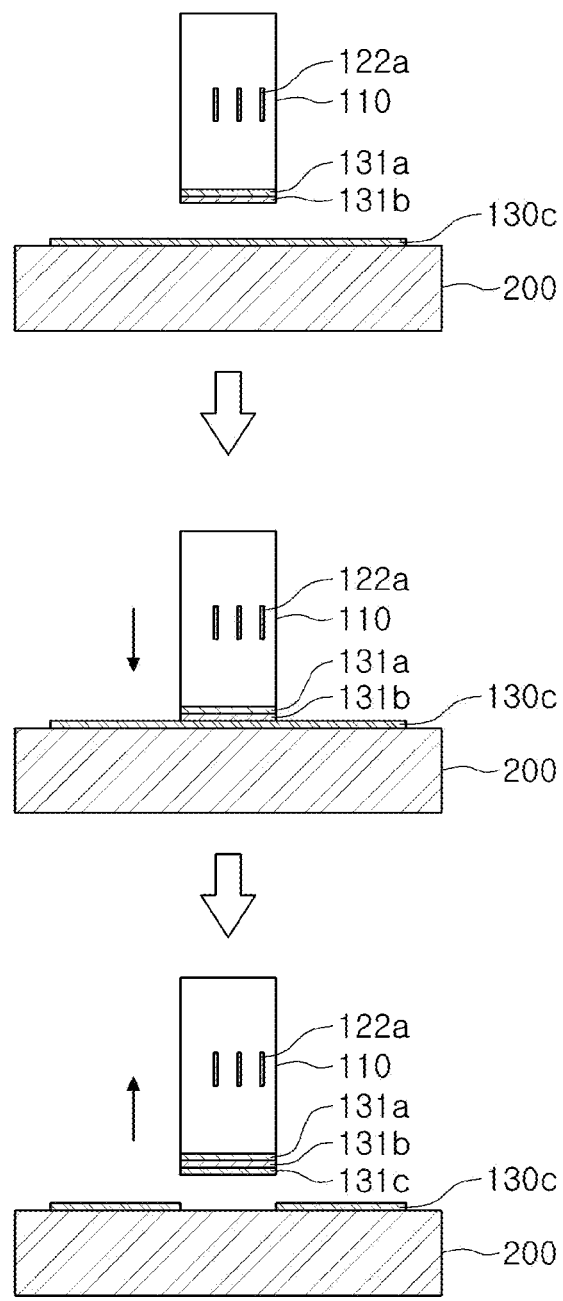
FIG. 8 illustrates a method of forming a metal layer sheet 131*c* by a transfer method.

FIGS. 6 to 8 illustrate a method of forming a connection metal layer 131a, a ceramic layer 131b, and a metal layer 131c by a transfer method.

As illustrated in FIG. 6, in the case of transferring a first connection metal layer 131a, a connection metal layer sheet 130a may be provided on a support 200, and a body 110 may be compressed thereon, to cause the first connection metal layer 131a to be adhered to a surface of the body 110. The first connection metal layer sheet 130a may be a state before a sintering process, and may comprise components such as a binder, an organic solvent, and the like.

Thereafter, as illustrated in FIG. 7, a ceramic layer sheet 130b may be provided on a support 200, and a body 110 may be compressed thereon, to cause a first ceramic layer 131b to be adhered to a surface of the first connection metal layer 131a. The ceramic layer sheet 130b may be a state before a sintering process, and may comprise components such as a binder, an organic solvent, and the like.

Next, as illustrated in FIG. 8, a metal layer sheet 130c may be provided on a support 200, and a body 110 may be compressed thereon, to cause a first metal layer 131c to be adhered to a surface of the first ceramic layer 131b. The first metal layer sheet 130c may be a state before a sintering process, and may comprise components such as a binder, an organic solvent, and the like.

Thereafter, a second connection metal layer 132a, a second ceramic layer 132b, and a second metal layer 132c may be formed by repeating the same process on surface opposite to the surfaces on which the first connection metal layer 131a, the first ceramic layer 131b and the first metal layer 131c are formed.

Although the method of using the operations of separately transferring the connection metal layer, the ceramic layer and the metal layer has been described, the connection metal layer sheet 130a, the ceramic layer sheet 130b, and the metal layer sheet 130c may be prepared in a state stacked on the support 200, to form a connection metal layer, a ceramic layer, and a metal layer by a single transfer process.

As using the above-described method, the first connection metal layer 131a, the first ceramic layer 131b, and the first metal layer 131c of the first external electrode 131 may be formed in the same shape and size as that of the third surface 3 of the body, and the second connection metal layer 132a, the second ceramic layer 132b, and the second metal layer 132c of the second external electrode 132 may be formed in the same shape and size as that of the fourth surface 4 of the body.

The first and second connection metal layers 131a and 132a, the first and second ceramic layers 131b and 132b, and the first and second metal layers 131c and 132c each may have a uniform thickness, since the connection metal layer sheet 130a, the ceramic layer sheet 130b, and the metal layer sheet 130c are used to form them.

The third and fourth external electrodes 133 and 134 may include first and second electrode layers 133a and 134a, and third and fourth plated layers 133b and 134b.

The first and second electrode layers 133a and 134a may function to improve the electrical connection with the second internal electrode 122. The first electrode layer 133a may be formed by printing a conductive paste containing metal particles on the body 110.

The first and second plated layers 131d and 132d of the first and second external electrodes and the third and fourth plated layers 133b and 134b of the third and fourth external electrodes may be formed at the same time, and may be formed using an electrolytic plating process. For example, it may be formed by a nickel (Ni) electrolytic plating process.

In addition, first, second, third and fourth tin (Sn) plated layers 131e, 132e, 133c, and 134c may be additionally formed on the first, second, third and fourth plated layers 131d, 132d, 133b, and 134b to improve the mounting characteristics.

A ratio of defect occurrence due to the above-described blurring phenomenon in which the first and second external electrodes 131 and 132 are in contact with the third and fourth external electrodes 133 and 134 may increase, as the size of the capacitor component decreases. Therefore, the effect according to the present disclosure may be more effective, as the size of the capacitor component is smaller. In particular, since a capacitor component with a size of 0603 (0.6 mm×0.3 mm) or smaller has a relatively high ratio of occurring the defects due to the above-described blurring phenomenon in which the first and second external electrodes 131 and 132 are in contact with the third and fourth external electrodes 133 and 134, in a case of using a conventional external electrode formation process, the effect according to the present disclosure may be more effective and remarkable in the capacitor component having the size of 0603 (0.6 mm×0.3 mm) or smaller.

Therefore, a measurement of the capacitor component in the second direction (the X direction) may be 0.6 mm or less, and a measurement of the capacitor component in the third direction (the Y direction) may be 0.3 mm or less.

According to an embodiment of the present disclosure, it is possible to obtain a capacitor component having improved moisture resistance reliability while reducing the thickness of the first and second external electrodes, and it is possible to prevent contact between the first and second external electrodes and the third and fourth external electrodes.

It should be understood, however, that the various and advantageous advantages and effects of the present disclosure is not limited to those described above, and may be more readily understood in the course of describing a specific embodiment of the present disclosure.

While example embodiments have been shown and described above, it will be apparent to those skilled in the art that modifications and variations could be made without departing from the scope of the present disclosure as defined by the appended claims.

What is claimed is:

1. A capacitor component comprising:
a body including a dielectric layer, and a first internal electrode and a second internal electrode disposed to oppose each other in a first direction with the dielectric layer interposed therebetween, and including a first surface and a second surface opposing each other in the first direction, a third surface and a fourth surface connected to the first and second surfaces and opposing each other in a second direction, a fifth surface and a sixth surface connected to the first to fourth surfaces and opposing each other in a third direction;

a first external electrode and a second external electrode respectively disposed on the third and fourth surfaces of the body, and connected to the first internal electrode; and a third external electrode and a fourth external electrode respectively disposed on the fifth and sixth surfaces of the body, and connected to the second internal electrode, wherein the first and second external electrodes include first and second connection metal layers, first and second ceramic layers, first and second metal layers, and first and second plated layers, respectively, sequentially disposed on the body, wherein the first and second plated layers are extended and disposed to contact end surfaces of the first and second connection metal layers, the first and second ceramic layers, and the first and second metal layers in the first direction, respectively.

2. The capacitor component according to claim 1, wherein at least one of the first and second plated layers is extended and disposed to contact end surfaces of the corresponding connection metal layer, the ceramic layer, and the metal layer in the first and third directions.

3. The capacitor component according to claim 1, wherein at least one of the first and second connection metal layers is disposed in a manner such that the first connection metal layer does not deviate from the third surface of the body, or in a manner such that the second connection metal layer does not deviate from the fourth surface of the body.

4. The capacitor component according to claim 1, wherein the first connection metal layer, the first ceramic layer, and the first metal layer of the first external electrode have a shape and size corresponding to the third surface of the body, and/or the second connection metal layer, the second ceramic layer, and the second metal layer of the second external electrode have a shape and size corresponding to the fourth surface of the body.

5. The capacitor component according to claim 1, wherein the first and second connection metal layers, the first and second ceramic layers, and the first and second metal layers each have a uniform thickness.

6. The capacitor component according to claim 1, wherein the first internal electrode and the first and second connection metal layers comprise a same metal.

7. The capacitor component according to claim 1, wherein the first and second connection metal layers comprise nickel (Ni), and the first and second metal layers comprise copper (Cu).

8. The capacitor component according to claim 1, wherein the first and second plated layers are each a nickel (Ni) plated layer.

9. The capacitor component according to claim 1, further comprising a tin (Sn) plated layer disposed on each of the first and second plated layer.

10. The capacitor component according to claim 1, wherein a measurement of the capacitor component in the second direction is 0.6 mm or less, and a measurement of the capacitor component in the third direction is 0.3 mm or less.

11. The capacitor component according to claim 1, wherein the first internal electrode is exposed to the third and fourth surfaces of the body to be connected to the first and second connection metal layers.

12. The capacitor component according to claim 1, wherein the second internal electrode comprises first and second lead portions respectively exposed to the fifth and sixth surfaces of the body.

13. The capacitor component according to claim 1, wherein the third and fourth external electrodes each comprise first and second electrode layers, and third and fourth plated layers disposed on the first and second electrode layers, respectively.

14. The capacitor component according to claim 1, wherein the third and fourth external electrodes extend to the first and second surfaces of the body.

15. The capacitor component according to claim 1, wherein at least one of the first and second ceramic layers comprises a greater amount of an organic material component than that of the body.

16. The capacitor component according to claim 1, wherein the first and second internal electrodes include a conductive paste comprising one or more of a noble metal material selected from the group consisting of palladium (Pd), a palladium-silver (Pd—Ag) alloy, nickel (Ni) and copper (Cu).

17. The capacitor component according to claim 1, wherein the first and second external electrodes are a signal electrode, and the third and fourth external electrodes are a ground electrode.

18. The capacitor component according to claim 1, wherein the first and second ceramic layers are formed in a manner such that the first and second ceramic layers do not cover the end surfaces of the first and second connection metal layers in the first direction and the third direction, respectively.

* * * * *